US012488058B2

(12) United States Patent
Desai et al.

(10) Patent No.: US 12,488,058 B2
(45) Date of Patent: Dec. 2, 2025

(54) PHISHING DETECTION OF UNCATEGORIZED URLs USING HEURISTICS AND SCANNING

(71) Applicant: Zscaler, Inc., San Jose, CA (US)

(72) Inventors: Deepen Desai, San Ramon, CA (US); Zhenxiang Wang, Kenmore, WA (US)

(73) Assignee: Zscaler, Inc., San Jose, CA (US)

(*) Notice: Subject to any disclaimer, the term of this patent is extended or adjusted under 35 U.S.C. 154(b) by 333 days.

(21) Appl. No.: 16/889,885

(22) Filed: Jun. 2, 2020

(65) Prior Publication Data

US 2021/0377301 A1 Dec. 2, 2021

(51) Int. Cl.
G06F 16/95 (2019.01)
G06F 16/955 (2019.01)
G06F 18/214 (2023.01)
G06F 21/55 (2013.01)
G06F 40/289 (2020.01)
G06N 20/00 (2019.01)
H04L 9/40 (2022.01)

(52) U.S. Cl.
CPC .......... *G06F 16/955* (2019.01); *G06F 18/214* (2023.01); *G06F 21/55* (2013.01); *G06F 40/289* (2020.01); *G06N 20/00* (2019.01); *H04L 63/1483* (2013.01); *G06F 2221/2119* (2013.01)

(58) Field of Classification Search
CPC . H04L 63/1483; G06F 16/955; G06F 40/289; G06F 21/55; G06F 2221/2119; G06N 20/00; G06V 10/768; G06V 30/10; G06K 9/6256
USPC .......................................................... 726/22
See application file for complete search history.

(56) References Cited

U.S. PATENT DOCUMENTS

| 9,065,850 | B1 | 6/2015 | Sobrier |
| 9,838,407 | B1 | 12/2017 | Oprea et al. |
| 10,142,362 | B2 | 11/2018 | Weith et al. |
| 10,419,477 | B2 | 9/2019 | Desai et al. |
| 10,498,605 | B2 | 12/2019 | Weith et al. |

(Continued)

FOREIGN PATENT DOCUMENTS

GB 2575052 A 1/2020

OTHER PUBLICATIONS

Khonji, "Phishing Detection: A Literature Survey", 2013, IEEE, vol. 15, pp. 2091-2120 (Year: 2013).*

(Continued)

Primary Examiner — Taghi T Arani
Assistant Examiner — Gregory A Lane
(74) Attorney, Agent, or Firm — Baratta Law PLLC; Lawrence A. Baratta, Jr.

(57) ABSTRACT

Systems and methods include obtaining a Uniform Resource Locator (URL) for a site on the Internet; analyzing the URL with a Machine Learning (ML) model to determine whether or not the site is suspicious for phishing; responsive to the URL being suspicious for phishing, loading the site to determine whether or not an associated brand of the site is legitimate or not; and, responsive to the site being not legitimate for the brand, categorizing the URL for phishing and performing a first action based thereon. The systems and methods can further include, responsive to the URL being not suspicious for phishing or the site being legitimate for the brand, categorizing the URL as legitimate and performing a second action based thereon.

15 Claims, 3 Drawing Sheets

(56) References Cited

U.S. PATENT DOCUMENTS

| | | | |
|---|---|---|---|
| 2008/0154730 A1* | 6/2008 | Schmelzer | H04L 63/1408 726/22 |
| 2009/0077383 A1* | 3/2009 | de Monseignat | H04L 9/3242 713/176 |
| 2015/0288716 A1* | 10/2015 | Emigh | H04N 19/48 726/22 |
| 2016/0294851 A1* | 10/2016 | Langton | G06F 21/566 |
| 2017/0185904 A1* | 6/2017 | Padmanabhan | G06N 5/04 |
| 2018/0139235 A1 | 5/2018 | Desai et al. | |
| 2019/0281073 A1 | 9/2019 | Weith et al. | |
| 2019/0319972 A1 | 10/2019 | Desai | |
| 2020/0036751 A1* | 1/2020 | Kohavi | H04L 63/1416 |
| 2020/0195667 A1* | 6/2020 | Li | H04L 63/1433 |
| 2020/0404000 A1* | 12/2020 | Hayes | G06F 21/62 |
| 2021/0021637 A1* | 1/2021 | Srivastava | H04L 63/0876 |
| 2021/0185057 A1* | 6/2021 | McLean | H04L 63/1416 |
| 2021/0203693 A1* | 7/2021 | Clausen | H04L 63/1425 |
| 2021/0256681 A1* | 8/2021 | Segal | G06V 20/62 |
| 2022/0021703 A1* | 1/2022 | Kodera | H04L 63/1483 |

OTHER PUBLICATIONS

Lalouani et al., "Multi-observable reputation scoring system for flagging suspicious user sessions," Computer Networks, vol. 182, Aug. 8, 2022, pp. 1-13.

Jan. 10, 2022, Extended European Search Report issued for European Patent Application No. EP 21 19 1871.

* cited by examiner

PHISHING DETECTION OF UNCATEGORIZED URLs USING HEURISTICS AND SCANNING

FIELD OF THE DISCLOSURE

The present disclosure relates generally to networking and computing. More particularly, the present disclosure relates to systems and methods of phishing detection of uncategorized Uniform Resource Locators (URLs) using heuristics and scanning.

BACKGROUND OF THE DISCLOSURE

Phishing is the fraudulent process of attempting to acquire sensitive information, such as usernames, passwords, payment detail, personal identification information, etc., by masquerading as a trustworthy entity. For example, communications purporting to be from popular social web sites, auction sites, online payment processors, banks or other financial institutions, etc. are commonly used to lure unsuspecting users. Phishing often directs users to enter details at a fake website whose look and feel are almost identical to a legitimate one, such website having a URL associated with it. Phishing is an example of social engineering used to fool users and exploit the poor usability of current web security technologies. For example, emails, supposedly from the Internal Revenue Service, have been used to glean sensitive data from U.S. taxpayers. Most methods of phishing use some form of technical deception designed to make a link appear to belong to the spoofed organization. Misspelled URLs or the use of subdomains are common tricks used by phishers. In the following example URL, www.yourbank.example.com/, it appears as though the URL will take you to the example section of the yourbank website; actually this URL points to the "yourbank" (i.e., phishing) section of the example website. That is, phishing focuses on using popular brands to confuse users. Another common trick is to make the displayed text for a link (the text between the <A> tags) suggest a reliable destination, when the link actually goes to a phishers' site.

Unfortunately, phishing is very common and very effective using social engineering. There have been various recent email hacking horror stories in the corporate and political areas. These basically occur where emails, text messages, etc. are sent to unsuspecting users who inadvertently provide their credentials into phishing sites. As such, the malicious actors obtain the credentials and use it for their malicious goals. Organizations and individuals have been held hostage by these malicious actors. As long as users continue to input credentials for accessing resources, malicious actors will seek to exploit this security weakness.

Existing phishing sites that have been detected are categorized in lists of known phishing sites. This can be used to block users, notify users, etc. However, malicious entities are ever evolving, and new phishing sites pop up all the time. In fact, phishing sites generally have a very short lifetime since once caught, they are no longer effective for their malicious goals. Thus, new phishing sites are put up constantly to evade categorization. A new, uncategorized site may be a phishing site or it may be a legitimate site. One policy may include blocking all new, uncategorized sites. However, this leads to poor user experience where new legitimate sites are blocked. Another policy may include scanning and detailed analysis of such new, uncategorized sites. However, this leads to latency which also leads to poor user experience. A further policy may include no phishing protection at all leaving it up to the user to manually identify legitimate or phishing sites. Of course, this approach is ineffective. There is a need to quickly, correctly, and efficiently identify whether a new site is phishing or legitimate.

BRIEF SUMMARY OF THE DISCLOSURE

The present disclosure relates to systems and methods of phishing detection of uncategorized Uniform Resource Locators (URLs) using heuristics and scanning. The phishing detection can detect if a URL is a likely phishing site or legitimate. An input to the phishing detection includes a URL, such as a new, uncategorized URL. The phishing detection scans the URL itself to determine whether it is phishing. The scan includes use of a Machine Learning (ML) model trained to detect suspicious URLs. For example, the phishing detection can use Term Frequency-Inverse Document Frequency (TDIDF) to generate features of a URL, and a Logical Regression model to train the model and predict using the trained model with the features generated by TDIDF. After a URL is flagged as suspicious, the phishing detection loads the URL, such as in isolation, and looks to identify a brand associated with the URL. Specifically, the present disclosure relates to detecting phishing URLs that attempt to impersonate legitimate brands. The load can be used to determine whether the suspect URL is phishing or legitimate based on analysis of code, metadata, etc. With the scan and load, the phishing detection can quickly, correctly, and efficiently categorize a suspect URL. Once categorized, the phishing detection can cause the URL to be allowed or blocked.

In an embodiment, the present disclosure includes a non-transitory computer-readable storage medium having computer-readable code stored thereon for programming one or more processors to perform various steps. In another embodiment, a computer-implemented method is configured to perform the various steps. In a further embodiment, a server is configured to implement the steps. The steps include obtaining a Uniform Resource Locator (URL) for a site on the Internet; analyzing the URL with a Machine Learning (ML) model to determine whether or not the site is suspicious for phishing; responsive to the URL being suspicious for phishing, loading the site to determine whether or not an associated brand of the site is legitimate or not; and, responsive to the site being not legitimate for the brand, categorizing the URL for phishing and performing a first action based thereon.

The steps can further include, responsive to the URL being not suspicious for phishing or the site being legitimate for the brand, categorizing the URL as legitimate and performing a second action based thereon. The steps can further include, prior to the analyzing, training the ML model with a set of training data including URL data including a first set of phishing URLs and a second set of legitimate URLs. The steps can further include updating the ML model with an updated set of training data. The ML model can be based on features extracted from the URL. The features can be extracted using Term Frequency Inverse Document Frequency (TFIDF). The features can include a plurality of keywords in the URL, redirection in the URL, a suspicious Top-Level Domain (TLD), a non-standard port, fake Hypertext Transfer Protocol Secure (HTTPS), a Message Digest 5 (MD5) in the URL, a shortener in the URL, an @ symbol in the URL, an Internet Protocol (IP) address in the URL, and too many subdomains in the URL.

The loading the site can include obtaining a title, a copyright, metadata, and a screenshot of a page associated with the URL, and determining the site is legitimate or not based on comparing the brand from the screenshot with any of the title, the copyright, and the metadata. The steps can further include performing Optical Character Recognition on the screenshot to determine the text therein for the comparing.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods of phishing detection of uncategorized Uniform Resource Locators (URLs) using heuristics and scanning. The phishing detection can detect if a URL is a likely phishing site or legitimate. An input to the phishing detection includes a URL, such as a new, uncategorized URL. The phishing detection scans the URL itself to determine whether it is phishing. The scan includes use of a Machine Learning (ML) model trained to detect suspicious URLs. For example, the phishing detection can use Term Frequency-Inverse Document Frequency (TDIDF) to generate features of a URL, and a Logical Regression model to train the model and predict using the trained model with the features generated by TDIDF. After a URL is flagged as suspicious, the phishing detection loads the URL, such as in isolation, and looks to identify a brand associated with the URL. Specifically, the present disclosure relates to detecting phishing URLs that attempt to impersonate legitimate brands. The load can be used to determine whether the suspect URL is phishing or legitimate based on analysis of code, metadata, etc. With the scan and load, the phishing detection can quickly, correctly, and efficiently categorize a suspect URL. Once categorized, the phishing detection can cause the URL to be allowed or blocked.

Phishing Detection System

Figure 1:
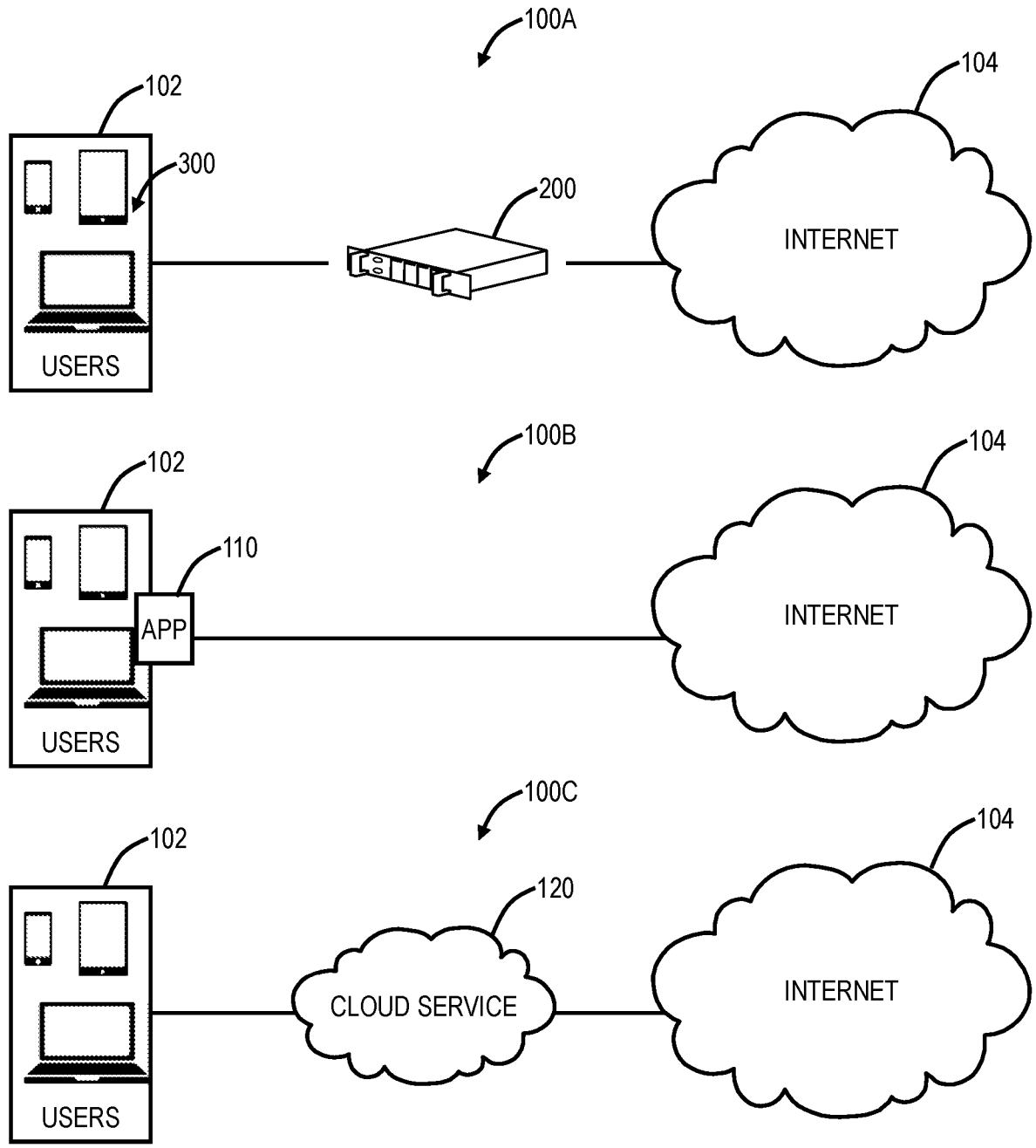
FIG. 1 is a network diagram of three example network configurations of phishing detection between a user (each having a user device such as illustrated in FIG. 3) and the Internet (e.g., a server such as illustrated in FIG. 2)
Figure 2:
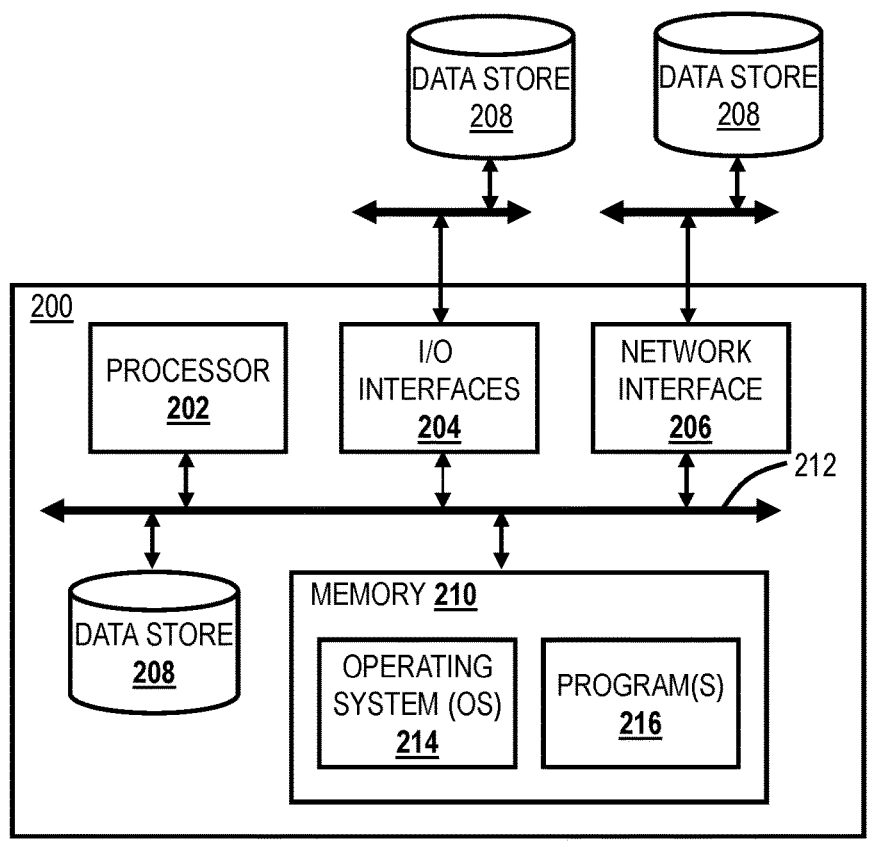
FIG. 2 is a block diagram of a server, which may be used in as a destination on the Internet, for a network configuration of phishing detection, etc.
Figure 3:
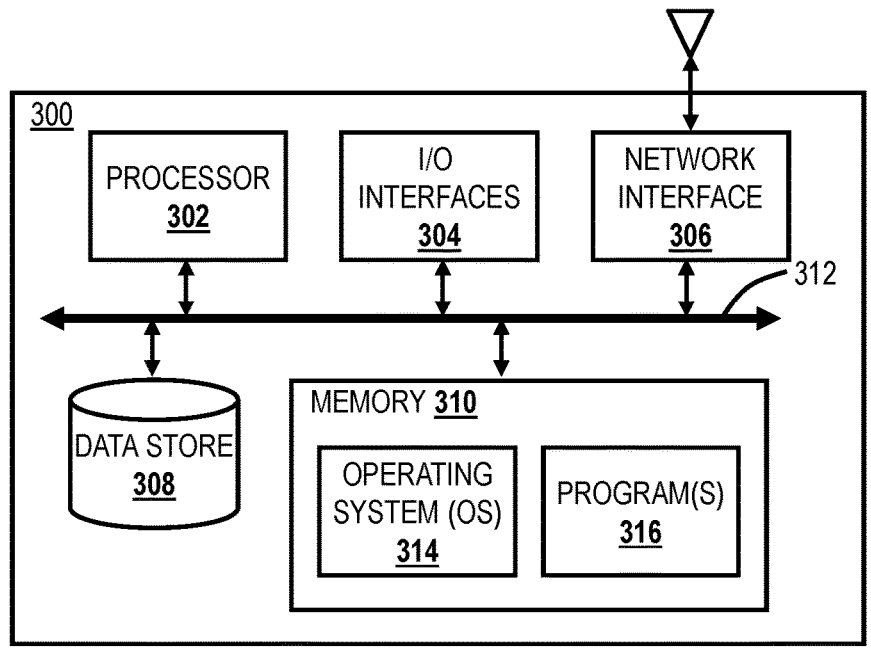
FIG. 3 is a block diagram of a user device that is configured to request URLs.

FIG. 1 is a network diagram of three example network configurations 100A, 100B, 100C of phishing detection between a user 102 (each having a user device 300 such as illustrated in FIG. 3) and the Internet 104 (e.g., a server 200 such as illustrated in FIG. 2). The objective of the phishing detection is to identify a URL requested by the user 102 as phishing or legitimate, and to block and/or flag phishing URLs and allow legitimate URLs. For example, the phishing URLs can be physically blocked so that the user 102 is unable to access these sites. Alternatively, the phishing URLs can be flagged to the user, e.g., "this site is a potential phishing site," allowing the user to proceed with caution. In a further embodiment, the phishing URLs can be loaded in isolation. Those skilled in the art will recognize the example network configurations 100A, 100B, 100C are described herein for illustration purposes and the phishing detection contemplates use in other approaches.

The network configuration 100A includes a server 200 located between the user 102 and the Internet 104. For example, the server 200 can be a proxy, a gateway, a Secure Web Gateway (SWG), Secure Internet and Web Gateway, etc. The server 200 is illustrated located inline with the user 102 and configured to monitor URL requests for phishing detection and remediation. In other embodiments, the server 200 does not have to be inline. For example, the server 200 can monitor the URL requests and provide feedback to the user 102 or specific actions to the user device 300. The server 200 can be on a local network associated with the user 102 as well as external, such as on the Internet 104. The network configuration 100B includes an application 110 that is executed on the user device 300. The application 110 can perform the same functionality as the server 200, as well as coordinated functionality with the server 200. Finally, the network configuration 100C includes a cloud service 120 configured to monitor the user 102 and perform the phishing detection. Of course, various embodiments are contemplated herein, including combinations of the network configurations 100A, 100B, 100C together.

The overall objective of the phishing detection includes identifying whether or not a URL is a phishing or legitimate site and allowing/blocking/alerting based thereon. To that end, the phishing detection can include the maintenance of a phishing list that includes all URLs categorized as phishing. The phishing detection can add newly categorized sites to this list as well. For example, the application 110 may be a browser add-in or agent that prohibits access to any sites in the list.

Example Server Architecture

FIG. 2 is a block diagram of a server 200, which may be used in as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 3 is a block diagram of a user device 300, which may be used by a user 102. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. The application 110 can be one of the example programs.

Phishing Detection

Figure 4:
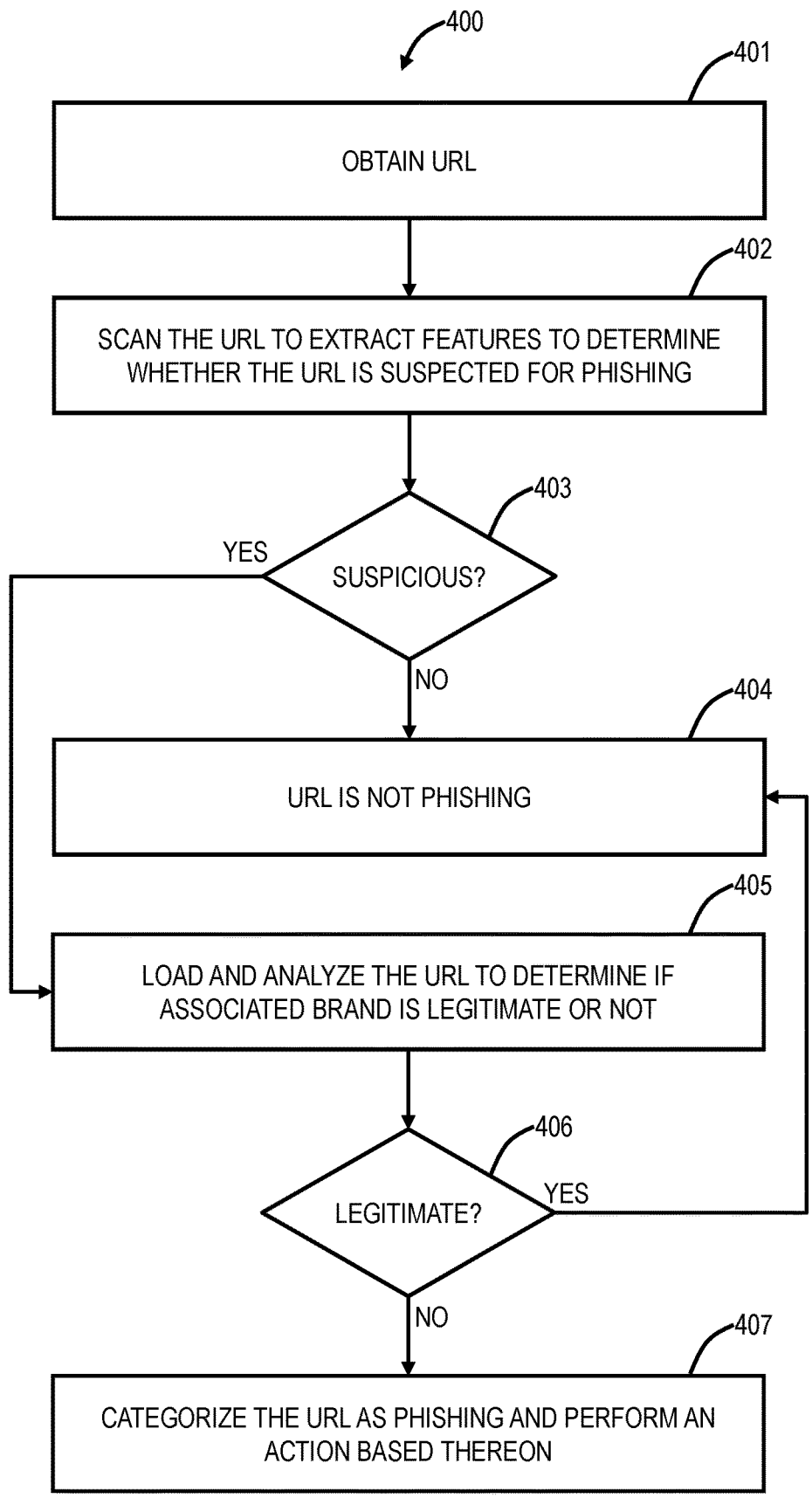
FIG. 4 is a flowchart of a phishing detection process.

FIG. 4 is a flowchart of a phishing detection process 400. The phishing detection process 400 contemplates implementation as a computer-implemented method, as instructions embodied in a non-transitory computer readable medium, and via a processing device such as the server 200. The phishing detection process 400 can be used to categorize a URL as phishing or legitimate. Such categorization can be used to manage a list of phishing sites for use in the network configurations 100A, 100B, 100C as well as other network configurations. The objective of the phishing detection process 400 is to determine whether or not a user 102 can access a URL.

The phishing detection process 400 includes obtaining a URL (step 401). This can be based on monitoring of the user 102. This can also be offline where a list of new URLs are provided to a server 200 or the like for categorization. That is, the phishing detection process 400 contemplates any technique where the URL is provided. In an embodiment, there can be a list of known phishing sites and the obtained URL can be one that is not in the list, i.e., new and uncategorized.

The phishing detection process 400 includes scanning the URL to extract features to determine whether the URL is suspected for phishing (step 402). The phishing detection process 400 utilizes a Machine Learning (ML) model to find suspicious URLs. In an embodiment, TFIDF is used to generate features of a URL. TFIDF is combination of two statistical techniques, TF—Term Frequency and IDF—Inverse Document Frequency.

The features are extracted solely from the URL itself. For example, the features can include keywords in the URL, redirection in the URL, a suspicious Top-Level Domain (TLD), a non-standard port, fake Hypertext Transfer Protocol Secure (HTTPS), a Message Digest 5 (MD5) in the URL, a shortener in the URL, an @ symbol in the URL, an Internet Protocol (IP) address in the URL, too many subdomains in the URL, etc.

The keywords in the URL that have been determined to be suspicious for phishing include:

| login | transaction | secure | safe |
| log-in | recover | ebayispai | session |
| sign-in | unlock | https | support |
| signin | confirm | auth | suport |
| account | live | authorize | unlock |
| verification | office | myaccount | update |
| verify | service | activation | verify |
| webscr | manage | #apps | verification |
| password | invoice | confirm | everivcation |
| credentuail | secure | drive | verifications |
| support | customer | mails | wallet |
| activity | client | mail | weblogin |
| security | bill | managment | management |
| update | online | password | .wellknown |
| authentication | safe | permission | .well-known |
| authenticate | form | permision | spotify |
| authorize | confirm | recovery | |
| alert | account | recover | |
| purchase | banking | register | |

Redirection in the URL is a technique where the URL redirects to another page when the URL is opened. There are legitimate reasons for redirection such as for URL shortening, to prevent broken links, to allow multiple domain names to refer to a single web site, privacy, etc. Top-level domains (TLDs), such as .com, .org, and .edu, are the most prominent domains on the Internet 104. A suspicious TLD is a TLD far less familiar to everyday internet users, and frequently weaponized for malicious objectives. Suspicious TLDs—domains ending with things like .xyz, .gq, .country, .stream,—are popular with cybercriminals because they are usually cheaper to obtain than more universally recognized TLDs.

Non-standard ports can include various ports that are used by HTTP/HTTP besides ports 80 and 443. Some example non-standard ports can include 9090, 8080, 22, 23, 25, 53, 161, 445, 3389, 5500, 5900 . . . 5999, 9001, etc. Fake HTTPS means the URL displays a secure icon, but it is fake. Phishers utilize fake HTTPS to give a sense of security to unsuspecting users 102. An MD5 includes a hash in the URL. A shortener in the URL can be something like x.xyz, etc. and utilizes redirection.

These are ten examples of features that can be extracted from the obtained URL. The phishing detection process 400 can also use a ML model that is trained and then used to identify suspicious URLs. In an embodiment, a Logistic Regression model is used to train/predict the model using features generated by TFIDF. Of note, the Logistic Regression model was determined to have the best detection efficacy. The ML model is trained utilizing a set of training data where a set of URLs are provided—a first subset including legitimate URLs and a second subset including phishing URLs. The training can be updated over time with a new set of training data as the phishing environment is constantly evolving to evade detection.

Once trained, the ML model can be used in production (i.e., in a working environment) to categorize URLs as suspected of phishing or not (step 403). Specifically, the obtained URL has its features extracted (step 402) and is analyzed with the ML model (step 402). An output of the ML model includes whether the obtained URL is suspicious for phishing or not (step 403). If the URL is not suspicious (step 403), the phishing detection process 400 categorizes the URL as legitimate (not phishing) (step 404). This categorization can be used to allow the user 102 to access the URL, to keep the URL off a list of phishing sites, to keep the URL on a list of legitimate sites, etc.

If the ML categorizes the obtained URL as suspicious (step 403), the phishing detection process 400 includes loading and analyzing the URL to determine if the associated brand is legitimate or not (step 405). Again, the phishing detection process 400 is for detecting phishing sites that masquerade as legitimate brands, e.g., bancofamerica.com instead of bankofamerica.com. After the URL is classified as suspicious by the ML model (step 403), the phishing detection process 400 next determines whether it is legitimate or not for the brand. That is, this could be a legitimate site owned by the brand owner, not a phishing site.

The loading and analyzing can inspect the title, copyright, metadata, and page text of the URL for the purposes of determining whether the site is legitimate with respect to the brand or a phishing site using someone else's brand (step 406). Of note, a phishing site typically focuses solely on the visible aspects to the user 102 and does not focus on the code, e.g., the title, copyright, metadata, and page text. Inspection of this data enables a determination of whether the obtained URL is legitimate or not. The page text can be obtained by taking a screenshot of the loaded page and performing Optical Character Recognition (OCR).

Legitimate sites will have the title, copyright, and metadata match the page text that is obtained from the OCR. If the obtained URL is legitimate (step 406), the phishing detection process 400 categorizes the URL as legitimate (not phishing) (step 404). If the obtained URL is phishing (step 406), the phishing detection process 400 categorizes the URL as phishing and includes performing an action based thereon. The actions can include blocking the URL, updating a list of phishing sites, presenting an alert to the user, and the like.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:

subsequent to training a Machine Learning (ML) model exclusively with Uniform Resource Locator (URL)-based keywords extracted solely from known phishing Uniform Resource Locators (URLs) and legitimate URLs, obtaining a URL for a site on the Internet;

extracting features of the obtained URL to utilize in determining if the site is suspicious, wherein the features consisting essentially of keyword features identified within the URL string itself indicative of phishing, specifically including redirection in the URL, a suspicious Top-Level Domain (TLD), utilization of a non-standard port, fake Hypertext Transfer Protocol Secure (HTTPS), a Message Digest 5 (MD5) in the URL, a shortener in the URL, an @ symbol in the URL, an Internet Protocol (IP) address in the URL, and a number of subdomains in the URL, wherein the features are used solely for determining if the URL is suspicious and wherein the extraction is performed via the ML model using Term Frequency-Inverse Document Frequency (TFIDF) performed exclusively on the URL string itself;

analyzing the extracted features of the obtained URL with the ML model to determine whether or not the site is suspicious for phishing;

responsive to the ML model determining the obtained URL is suspicious for phishing, loading the site in an isolated environment configured specifically to block any outbound network communications and to prevent execution of scripts or malicious code to determine whether or not an associated brand of the site is legitimate or not;

subsequent to the loading, obtaining a title, a copyright, metadata, and a screenshot of a page associated with the obtained URL;

performing Optical Character Recognition (OCR) on the screenshot to extract textual content;

performing a textual consistency check by comparing textual content extracted solely from the screenshot via OCR against the obtained title, copyright, and metadata, to verify internal textual consistency without accessing external reference data or databases containing known phishing URLs or external suspiciousness ratings;

comparing a brand from the screenshot as identified through the OCR with the title, the copyright, and the metadata to determine a legitimacy of the site;

determining whether the site is considered legitimate, based on (1) whether the obtained URL is not suspicious for phishing and (2) if the obtained title, the obtained copyright, and the obtained metadata match the brand from the screenshot; and responsive to the site being not legitimate for the brand, categorizing the obtained URL for phishing and performing a first action based thereon.

2. The non-transitory computer-readable storage medium of claim 1, wherein the steps further include responsive to the URL being not suspicious for phishing or the site being legitimate for the brand, categorizing the URL as legitimate and performing a second action based thereon.

3. The non-transitory computer-readable storage medium of claim 1, wherein the steps further include updating the ML model with an updated set of training data.

4. The non-transitory computer-readable storage medium of claim 1, wherein the ML model is adapted to determine if the URL is suspicious based on the number of subdomains in the URL, and one or more additional features solely extracted from the URL itself.

5. The non-transitory computer-readable storage medium of claim 4, wherein the features are extracted using Term Frequency Inverse Document Frequency (TFIDF) and wherein TFIDF is used to generate features to train the ML model.

6. The non-transitory computer-readable storage medium of claim 1, wherein the steps further include
performing Optical Character Recognition on the screenshot to determine a text therein for the comparing; and
comparing the obtained title, copyright, and metadata to the text obtained from the Optical Character Recognition on the screenshot for determining whether the site is considered legitimate.

7. A method comprising:
subsequent to training a Machine Learning (ML) model exclusively with Uniform Resource Locator (URL)-based keywords extracted solely from known phishing Uniform Resource Locators (URLs) and legitimate URLs, obtaining a URL for a site on the Internet;
extracting features of the obtained URL to utilize in determining if the site is suspicious, wherein the features consisting essentially of keyword features identified within the URL string itself indicative of phishing, specifically including redirection in the URL, a suspicious Top-Level Domain (TLD), utilization of a non-standard port, fake Hypertext Transfer Protocol Secure (HTTPS), a Message Digest 5 (MD5) in the URL, a shortener in the URL, an @ symbol in the URL, an Internet Protocol (IP) address in the URL, and a number of subdomains in the URL, wherein the features are used solely for determining if the URL is suspicious and wherein the extraction is performed via the ML model using Term Frequency-Inverse Document Frequency (TFIDF) performed exclusively on the URL string itself;
analyzing the extracted features of the obtained URL with the ML model to determine whether or not the site is suspicious for phishing;
responsive to the ML model determining the obtained URL is suspicious for phishing, loading the site in an isolated environment configured specifically to block any outbound network communications and to prevent execution of scripts or malicious code to determine whether or not an associated brand of the site is legitimate or not;
subsequent to the loading, obtaining a title, a copyright, metadata, and a screenshot of a page associated with the obtained URL;
performing Optical Character Recognition (OCR) on the screenshot to extract textual content;
performing a textual consistency check by comparing textual content extracted solely from the screenshot via OCR against the obtained title, copyright, and metadata, to verify internal textual consistency without accessing external reference data or databases containing known phishing URLs or external suspiciousness ratings;
comparing a brand from the screenshot as identified through the OCR with the title, the copyright, and the metadata to determine a legitimacy of the site;
determining whether the site is considered legitimate, based on (1) whether the obtained URL is not suspicious for phishing and (2) if the obtained title, the obtained copyright, and the obtained metadata match the brand from the screenshot; and
responsive to the site being not legitimate for the brand, categorizing the obtained URL for phishing and performing a first action based thereon.

8. The method of claim 7, further comprising
responsive to the URL being not suspicious for phishing or the site being legitimate for the brand, categorizing the URL as legitimate and performing a second action based thereon.

9. The method of claim 7, further comprising
updating the ML model with an updated set of training data.

10. The method of claim 7, wherein the ML model is adapted to determine if the URL is suspicious based on the number of subdomains in the URL, and one or more additional features solely extracted from the URL itself.

11. The method of claim 7, further comprising
performing Optical Character Recognition on the screenshot to determine a text therein for the comparing; and
comparing the obtained title, copyright, and metadata to the text obtained from the Optical Character Recognition on the screenshot for determining whether the site is considered legitimate.

12. A server comprising:
a network interface communicatively coupled to a network;
a processor communicatively coupled to the network interface; and
memory storing computer-executable instructions that, when executed, cause the processor to
obtain a machine learning (ML) model trained from keywords and features extracted from phishing Uniform Resource Locators (URLs) and legitimate URLs;
obtain a URL for a site on the Internet;
extracting features of the obtained URL to utilize in determining if the site is suspicious, wherein the features consisting essentially of keyword features identified within the URL string itself indicative of phishing, specifically including redirection in the URL, a suspicious Top-Level Domain (TLD), utilization of a non-standard port, fake Hypertext Transfer Protocol Secure (HTTPS), a Message Digest 5 (MD5) in the URL, a shortener in the URL, an @ symbol in the URL, an Internet Protocol (IP) address in the URL, and a number of subdomains in the URL, wherein the features are used solely for determining if the URL is suspicious and wherein the extraction is performed via the ML model using Term Frequency-Inverse Document Frequency (TFIDF) performed exclusively on the URL string itself;
analyze the extracted features of the obtained URL with the ML model to determine whether or not the site is suspicious for phishing,
responsive to the ML model determining the obtained URL is suspicious for phishing, load the site in an isolated environment configured specifically to block any outbound network communications and to prevent execution of scripts or malicious code to determine whether or not an associated brand of the site is legitimate or not,
subsequent to the obtained URL being loaded, obtain a title, a copyright, metadata, and a screenshot of a page associated with the obtained URL,
perform Optical Character Recognition (OCR) on the screenshot to extract textual content;

perform a textual consistency check by comparing textual content extracted solely from the screenshot via OCR against the obtained title, copyright, and metadata, to verify internal textual consistency without accessing external reference data or databases containing known phishing URLs or external suspiciousness ratings;

compare a brand from the screenshot as identified through the OCR with the title, the copyright, and the metadata to determine a legitimacy of the site, determine whether the site is considered legitimate, based on (1) whether the obtained URL is not suspicious for phishing and (2) if the obtained title, the obtained copyright, and the obtained metadata match the brand from the screenshot, and responsive to the site being not legitimate for the brand, categorize the obtained URL for phishing and perform a first action based thereon.

13. The server of claim 12, wherein the computer-executable instructions that, when executed, further cause the processor to responsive to the URL being not suspicious for phishing or the site being legitimate for the brand, categorize the URL as legitimate and perform a second action based thereon.

14. The non-transitory computer-readable storage medium of claim 1, wherein the ML model is adapted to determine if the URL is suspicious based on utilization of a non-standard port of the URL, wherein the non-standard port is not ports 80 and 443.

15. The non-transitory computer-readable storage medium of claim 1, wherein the ML model is adapted to determine if the URL is suspicious based solely on a presence of an IP address in the URL.

* * * * *